UNITED STATES PATENT OFFICE.

HARRY E. TRAGER, OF ARCANUM, OHIO.

COMBINED HARROW AND HOE.

1,272,152.     Specification of Letters Patent.      Patented July 9, 1918.

Application filed July 5, 1917. Serial No. 178,719.

*To all whom it may concern:*

Be it known that I, HARRY E. TRAGER, a citizen of the United States, residing at Arcanum, in the county of Darke and State of Ohio, have invented certain new and useful Improvements in Combined Harrows and Hoes, of which the following is a specification.

This invention relates to improvements in harrows and diggers and it is the dominant object of the invention to provide a combination harrow and hoe which can be used without danger of injuring the roots of matter cultivated and which is especially adapted for use in cultivating, destroying weeds, pulverizing clods and crusts of earth and mulch cultivation.

Another and equally important object of the invention is to provide a novel form of harrow implement, the same being of such shape as to facilitate the cultivation of narrow rows of vegetable and like matter.

Other objects will be in part obvious and in part pointed out hereinafter.

The improvements in the details and arrangement of parts will be apparent from an inspection of the accompanying drawing, in connection with the specific description hereinafter, and wherein the preferred embodiment of the invention is disclosed for the purpose of imparting a full understanding of the same.

In the drawings.

Similar characters of reference are employed in all of the above described views to indicate corresponding parts.

Figure 1:
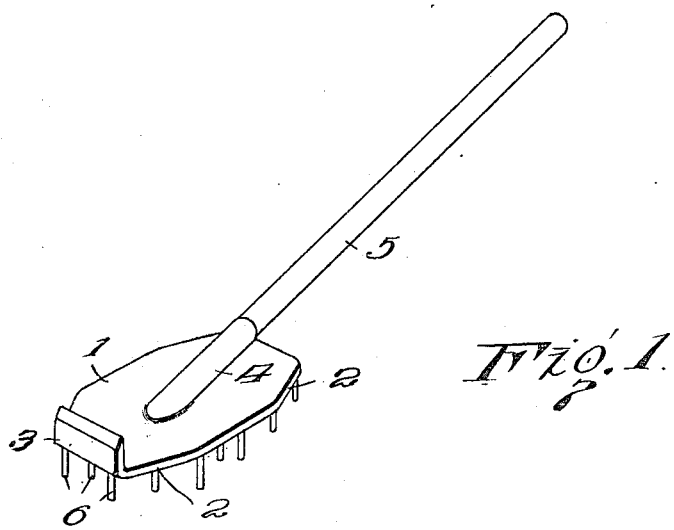
Figure 1 is a perspective of the improved cultivating implement.
Figure 2:
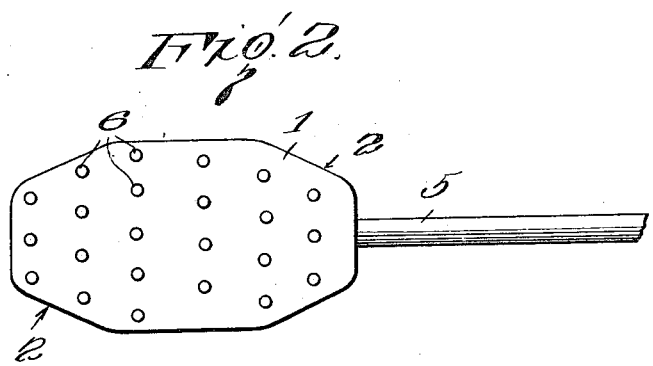
Fig. 2 is a bottom plan thereof.

Having more particular reference to the drawings, 1 designates the head or base of the improved cultivating implement, the opposite extremities thereof being tapered as indicated at 2, the forward extremity having an extension formed thereon, which extension is bent upwardly at substantially right angles to the head to form a hoe 3. Upon the upper face of the head 1 there is arranged an inclined socket 4 into which a handle 5 is inserted, this handle, if desired, being adjustable.

Teeth 6 arranged in staggered relation upon the lower face of the head 1 serve as the harrowing implement and as will be readily appreciated by those skilled in the art, will permit the same to be used for cultivating the soil about plants and like matter without danger of doing injury to the roots thereof. Further, by reason of the staggered relation of the teeth 6, the implement is also rendered especially desirable for use in destroying weeds, pulverizing clods, breaking up crusts of earth and for mulch cultivation.

Due to the peculiar shape of the head 2, that is, tapering the opposite extremities thereof, the implement can be advantageously used in cultivating between narrow rows of vegetable matter. Also, the hoe by reason of its position upon the forward extremity of the head 1 can be used for digging between narrow rows of plants or other vegetable matter without doing injury to the same.

If desired, the hoe 3 may be formed of a separate piece of material and secured to the head 1 by rivets or other suitable fastening devices.

Manifestly, the construction shown is capable of considerable modification and such modification as is within the scope of my claims, I consider within the spirit of my invention.

I claim:

1. A cultivating implement comprising a head having tapered ends, a hoe formed integral with one of said ends and extending above the upper face of the head, and a plurality of teeth arranged in staggered relation carried on the lower face of said head.

2. A cultivating implement comprising a head having tapered extremities, an extension formed on one of said extremities and bent upwardly to constitute a hoe, a socket arranged on the upper face of said head, and a plurality of teeth arranged in staggered relation on the bottom face of the head.

In testimony whereof I affix my signature hereto.

HARRY E. TRAGER.